United States Patent [19]
Slavejkov et al.

[11] Patent Number: 5,611,682
[45] Date of Patent: Mar. 18, 1997

[54] LOW-NO$_x$ STAGED COMBUSTION DEVICE FOR CONTROLLED RADIATIVE HEATING IN HIGH TEMPERATURE FURNACES

[75] Inventors: Aleksandar G. Slavejkov, Allentown; Thomas M. Gosling, Bethlehem; Robert E. Knorr, Jr., Allentown, all of Pa.

[73] Assignee: Air Products and Chemicals, Inc., Allentown, Pa.

[21] Appl. No.: 523,988

[22] Filed: Sep. 5, 1995

[51] Int. Cl.[6] .................................................. F23C 5/00
[52] U.S. Cl. .............................. 431/8; 431/10; 431/187; 431/353; 239/423; 239/553.5; 239/566
[58] Field of Search .............................. 431/8, 9, 10, 353, 431/187, 189; 239/553.5, 566, 417, 417.3, 420, 424, 416, 416.5, 423

[56] References Cited

U.S. PATENT DOCUMENTS

| | | |
|---|---|---|
| 3,547,568 | 12/1970 | Shisler .................................. 431/353 |
| 3,676,048 | 7/1972 | Sellors, Jr. et al. ..................... 431/353 |
| 3,976,420 | 8/1976 | Takahashi et al. ....................... 431/10 |
| 4,927,357 | 5/1990 | Yap . |
| 5,199,866 | 4/1993 | Joshi et al. ............................ 431/187 |
| 5,238,396 | 8/1993 | Yap . |
| 5,256,058 | 10/1993 | Slavejkov et al. . |
| 5,299,929 | 4/1994 | Yap . |
| 5,302,112 | 4/1994 | Nabors, Jr. et al. . |
| 5,346,390 | 9/1994 | Slavejkov et al. . |
| 5,360,171 | 11/1994 | Yap . |

Primary Examiner—James C. Yeung
Attorney, Agent, or Firm—Robert J. Wolff

[57] ABSTRACT

A staged oxy-fuel burner for producing a generally flat fuel rich flame overlying a highly radiative fuel lean flame, the burner having a fuel passage terminating in a nozzle, the fuel passage and nozzle having a generally elongated cross-section, a housing of complementary shape surrounding the fuel passage, so that when fuel is introduced into the fuel passage and an oxidizer is introduced into the passage defined by a space between the housing and the fuel passage a generally flat fuel rich flame is produced at the nozzle end of the fuel conduit and a staging nozzle for introducing oxidizer underneath and in a shape complementary to said fuel rich flame to produce a highly radiative fuel lean flame under said fuel rich flame. A precombustor having a cross-sectional shape complementary to that of flame end of the burner can be disposed on the flame end of the burner housing the precombustor having a nozzle underneath the flame end to introduce oxidizer underneath the fuel rich flame exiting the precombustor.

20 Claims, 8 Drawing Sheets

LOW-$NO_x$ STAGED COMBUSTION DEVICE FOR CONTROLLED RADIATIVE HEATING IN HIGH TEMPERATURE FURNACES

FIELD OF THE INVENTION

The present invention pertains to oxy-fuel methods and devices for producing elevated temperatures in industrial melting furnaces for such diverse products as metals, glass, ceramic materials and the like.

BACKGROUND OF THE INVENTION

Increased air quality regulations and strong market competition are forcing glass manufacturers to change the process of making glass. While post-combustion flue gas treatment techniques can solve the problem of pollution, they usually involve significant capital and operating costs making it more difficult for process improvements by the glass manufacturers to be economical.

One cost effective method for controlling emissions as well as reducing capital requirements is the implementation of oxy-fuel glass melting technology. Use of oxy-fuel in glass melting eliminates nitrogen in the melting process and reduces $NO_x$ and particulate emissions to below the levels set by the Environmental Protection Agency (EPA). In addition, oxy-fuel combustion reduces carbon dioxide emissions and brings numerous other benefits ranging from increased production capacity to savings in the amount of batch chemicals required.

Use of oxy-fuel burners in glass melting permits the burner designer to achieve varying flame momentum, glass melt coverage and flame radiation characteristics. Different burners produce different levels of $NO_x$ in furnaces where nitrogen is present from air leakage, low-purity oxygen supplied from a vacuum swing or pressure swing adsorption unit, nitrogen in the fuel, or nitrogen contained in the batch chemicals. Non-compliance with $NO_x$ emission standards, rules and regulations can lead to very large penalties and fines, substantial capital expenditure for clean-up technology, or require the purchase of $NO_x$ credits.

Conventional oxy-fuel burners used in glass melting have a significant problem in that the flame produced by the burner is relatively narrow and short providing very limited coverage of the molten glass in the furnace. Since such flames are at very high temperatures, areas immediately under those flames can easily overheat causing undesired side effects such as reboiling of the glass leading to the formation of scum on the melt surface. The scum on the melt surface is usually associated with poor heat transfer and inefficient melting operations. For some high quality glasses such as television panel and float glass, the glass quality can be significantly affected by the presence of scum in the furnace.

Another problem with conventional oxy fuel burners is related to the relatively low luminosity of an oxygen-natural gas flame. Radiation from such flames comes from the combustion products, water vapor and carbon dioxide, radiating predominantly wavelengths which are absorbed by the surface of the glass melt. This adversely affects the overall heat transfer as this surface absorbed heat is re-radiated not only where it needs to go, i.e. down into the lower layers of the glass melt, but also back up towards the furnace crown. In contrast, luminous flames radiate a significant portion of radiation in the wavelengths that penetrate glass, thus making it easier to deliver heat to the lower layers of the melt.

Another problem associated with the use of oxy-fuel burners is that they operate at relatively high momentum, i.e. flame velocity, which can increase volatilization of volatile batch components and increase particulate emissions. Such burners can also increase refractory corrosion due to higher refractory temperatures and higher volatile concentrations in the gas phase. U.S. Pat. Nos. 5,199,866; 5,256,058; and 5,346,390 disclose methods and devices for producing luminous flames at lowered flamed momentums. However, even with the advent of the patented burners and processes, flame radiation, flame coverage and $NO_x$ caused by leaky furnaces have not been fully addressed.

U.S. Pat. No. 4,927,357 discloses a gas-injection lance, burner which produces a flame by having an elongated fuel jet which entrains air from a port above the fuel jet intersecting an elongated gas (oxygen) jet inside a furnace to produce a flame flattening effect.

SUMMARY OF THE INVENTION

In order to overcome problems with prior art burners and combustion systems and to address the problems of flame radiation, flame coverage and $NO_x$ in leaky furnaces, it has been discovered that a staged flat flame combustion system and burner wherein a fuel rich flattened flame overlies a fuel lean highly radiative flame with the composite flame shaped in the form of an elongated or generally flat rectangle, flame luminosity is dramatically increased, thus enhancing heat transfer while reducing $NO_x$ emissions. According to the present invention, the burner contains a fuel passage having a generally elongated cross-section which is surrounded by a housing having a complementary cross-section, the housing being larger than the fuel passage to create a passage between the housing and the fuel passage. In a preferred embodiment, the housing and the fuel passage have a common end which lies in a plane generally perpendicular to the axis of the burner, to thus produce the flat flame which can be made fuel-rich by controlling the amount of oxidizer (oxygen) introduced into the oxygen passage. Disposed beneath the common end of the fuel and the oxidizer passages is an elongated oxidizer passage which is adapted to introduce oxygen underneath the fuel-rich flame produced by the upper portion of the burner to thus achieve the fuel-rich flame overlying the fuel-lean flame. According to the invention, a precombustor or burner block can be disposed on the flame end of the burner to further enhance operating characteristics of the burner. The precombustor or burner block contains an oxidizer passage which is of a complementary shape and generally parallel to the oxy-fuel flame passage to achieve the same fuel-rich oxy-fuel flame overlying a fuel-lean highly radiative flame.

DETAILED DESCRIPTION OF THE INVENTION

The present invention is directed to a method and apparatus that is an improvement over the method and apparatus shown and described in co-pending U.S. application Ser. No. 08/334,208 filed Nov. 4, 1994, the specification of which is incorporated herein by reference. The present invention is an improvement in the sense that it employs the invention of the copending application in a staged combustion system and process.

The following is a list of terms and assumptions used in describing this invention:

Oxygen is taken to mean an oxidizer gas with greater than 30% oxygen, preferably 80 to 100% oxygen.

Fuel is taken to mean any gaseous hydrocarbon fuel. Natural gas flames are usually not luminous, so the emphasis in the following detailed description is on natural gas as a fuel, however, it is reasonable to expect that the present invention increases flame luminosity of other gaseous fuels.

Burner nozzles are taken to mean burner nozzles of various cross-section geometries, where natural gas is introduced through the central nozzle and oxygen around it.

Precombustor, also sometimes referred to as the burner block, refractory tile, etc. A precombustor is made of a refractory material and its use is to provide a port in a furnace wall for mounting a burner. The internal shape of the precombustor plays a key role in determining flame exit velocity. A precombustor can also protect the burner from corrosive species and high furnace temperatures. The detailed description of the invention addresses the method and the apparatus both with and without a precombustor.

A discussion of flame luminosity is adequately developed in the co-pending application referred to above and need not be further discussed herein.

Figure 1:
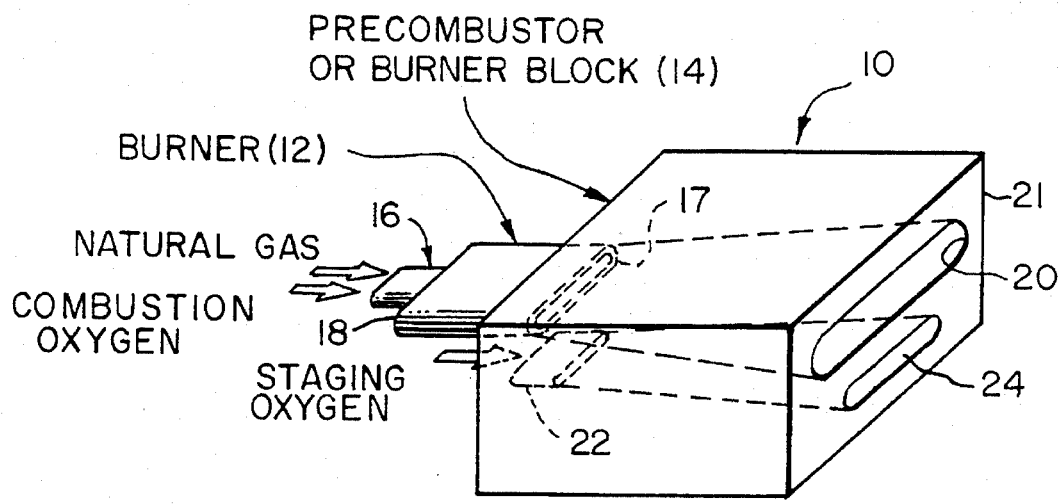
FIG. 1 is a schematic perspective view of an apparatus according to the present invention.

Referring to FIG. 1 the apparatus of the invention shown generally as 10 includes a burner 12 and a precombustor or burner block 14. The burner 12 is a concentric flat flame burner wherein natural gas is conducted down through an inner conduit 16 and oxygen is conducted through the passage defined by inner conduit 16 and outer conduit 18. The fuel (e.g. natural gas) conducted down through the conduit 16 and the oxygen in the passage between the conduit 16 and the outer conduit 18 are ignited to produce a flame in the burner passage 20 of precombustor 14. The apparatus of the present invention includes a staging oxygen passage 22 which is generally elongated in shape, having a shape complementary to the shape of the natural gas passage 16 of burner 12. Staging oxygen is conducted through passage 22 and out through a passage 24 in the burner block 14. The natural gas and the combustion oxygen combine to produce a flame at a discharge end 17 of natural gas passage 16. Staging oxygen exits passage 24 at the same face 21 of burner block 14. The fuel rich oxy-fuel flame combines with the staging oxygen flow after being discharged from discharge end 21 of burner block 14.

Figure 2:
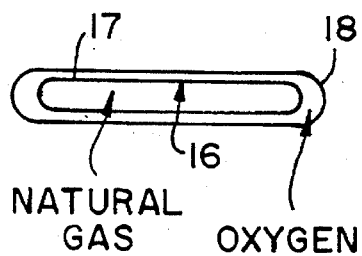
FIG. 2 is an enlarged front elevational view of the burner of FIG. 1.

FIG. 2 shows the discharge nozzle end of the burner 12 wherein the conduit 16 delivers natural gas and the passage between the conduit 16 and the outer conduit 18 is used to deliver oxygen for combustion with the natural gas.

Figure 3:
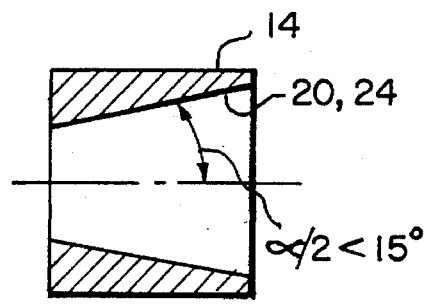
FIG. 3 is a schematic view representing a horizontal cross-section through the passages of the precombustor of FIG. 1.

FIG. 3 is a top sectional schematic view of the passage for both the flame produced by the burner 12 and the staging oxygen illustrating the angle of divergence for these passages. The angle of divergence is shown as the half angle ($\alpha/2$) being equal to or less than 15%.

Figure 4:
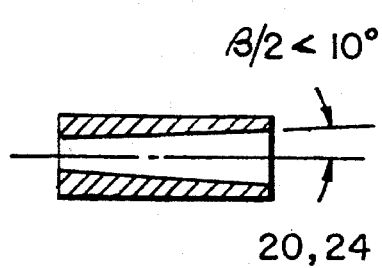
FIG. 4 is a vertical cross-section of the passages of the precombustor of FIG. 1.
Figure 5:
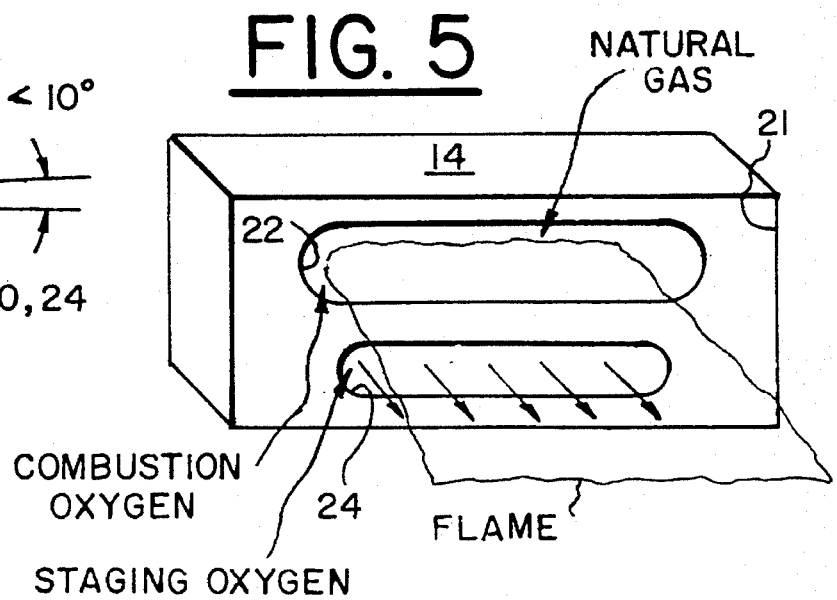
FIG. 5 is a perspective view illustrating the process of the present invention.

FIG. 4 is a vertical section through the burner block 14 showing the half angle ($\beta/2$ being equal to or less than 10°) for the flame and oxygen passages 20, 22 respectively.

Figure 6:
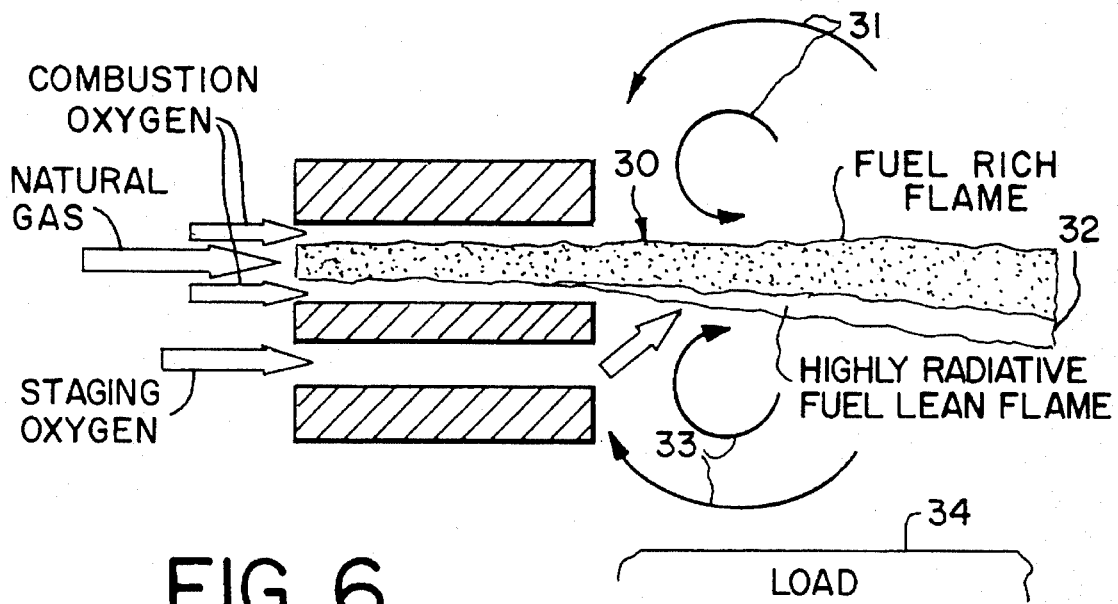
FIG. 6 is a schematic vertical cross-section of a combustion system according to the present invention.

FIG. 6 shows the invention in schematic form which figure can be used to describe the process of the invention with a burner block. As shown in FIG. 6, natural gas and combustion oxygen are combined to produce a fuel-rich flame 30. Staging oxygen is introduced beneath the fuel-rich flame to produce a highly radiative fuel-lean flame 32. Circulation patterns are shown by the arrows 31, 33 respectively for the fuel-rich flame and the fuel-lean flame. As shown in FIG. 6 a highly radiated fuel-lean flame can be produced over a furnace load 34 which can be molten glass as will hereinafter be more fully discussed. According to the present invention, staging oxygen is conducted to the apparatus by diverting a portion of the combustion oxygen from the burner used to produce the oxy-fuel fuel-rich flame. The amount of oxygen diversion is referred to as percent staging as will hereinafter be more fully described.

According to the present invention, a staged combustion method and apparatus produces lower $NO_x$, higher flame luminosity and better flame coverage than is currently available with oxy-fuel burners. The method and apparatus of the present invention can produce flames with more intense radiation directed toward the furnace load, e.g. glass, aluminum, steel, etc, than towards the crown of the furnace. This in turn should improve process efficiency, increase the life of furnace crown refractories, and improve product quality.

The natural gas surrounded by oxygen permits the flame to pass through the precombustor without damaging the walls. The reactant nozzle velocities should be kept below 600 ft. per second and should be identical for both natural gas and oxygen to provide optimum results. A discussion of the benefits of oxy-fuel combustion by controlling reactant velocities can be obtained from U.S. Pat. No. 5,199,866;

5,256,058; and 5,346,390 the specifications of which are incorporated herein by reference.

Staging oxygen velocity is, in general, lower or similar to the flame velocity to allow formation of a continuous higher-radiation flame zone directed towards the furnace load. The flame having a higher velocity entrains the lower velocity oxygen producing a fuel-lean flame zone as illustrated in FIG. 6. This is in contrast to the widely used high-velocity staging where an oxygen jet creates a localized high-temperature flame zone which usually reduces the overall flame length. The resulting delayed-mixing flame of the present invention, having a fuel-rich zone on the top and a fuel-lean zone on the bottom, is much longer, produces lower $NO_x$ and radiates more towards the furnace load than a non-staging flame.

According to the present invention where a precombustor is used, this being the preferred embodiment, a range of precombustor diverging angles is used to control the flame. The half angles for the nozzle and the horizontal plane are preferably equal to or less than 15°. The precombustor is used to enable flame acceleration as the volume of reactant, i.e. fuel and oxygen, increases due to temperature increase from combustion. The gases expand and flame velocity reaches maximum for the lowest angle. On the other hand, a divergence half angle of 15° in the combustor compensates for gas expansion and produces minimum acceleration. The preferred flame velocities at the exit end 21 of the burner block 14 are between 30 and 60 ft. per second as the flame exists the precombustor 14. Flame velocities below 30 ft. per second are too low to avoid lofting of the flame and allow for proper flame momentum in a high-temperature furnace. Flame velocity above 60 ft. per second begins to show increased turbulence which can reduce flame length and luminosity and increase the production of $NO_x$.

Figure 7:
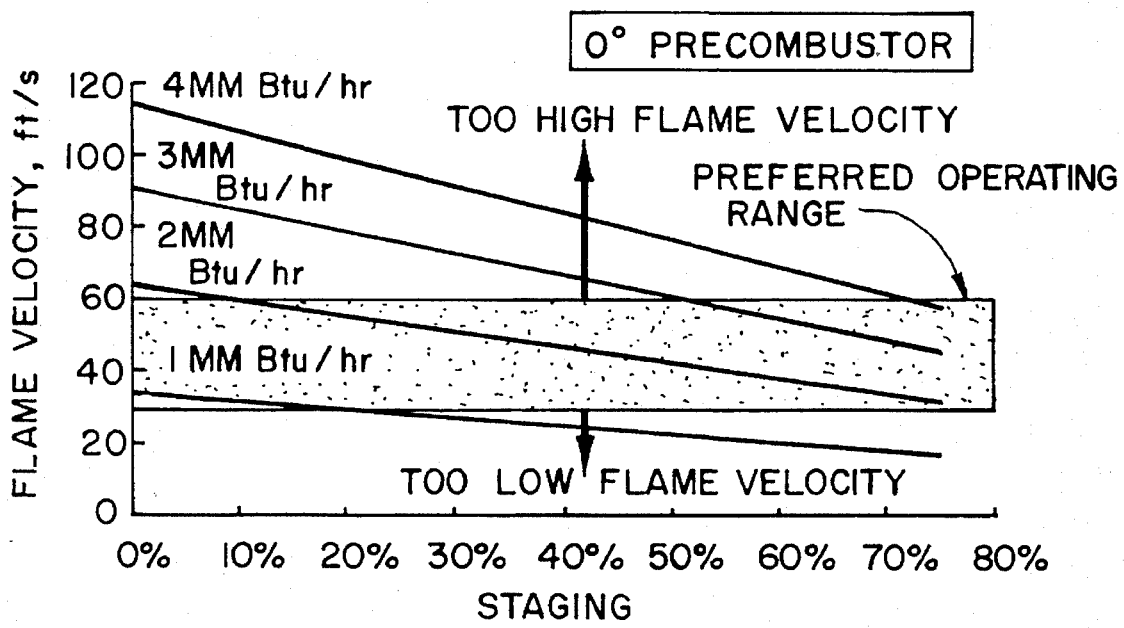
FIG. 7 is a plot of flame velocity against staging for an apparatus according to the present invention.
Figure 8:
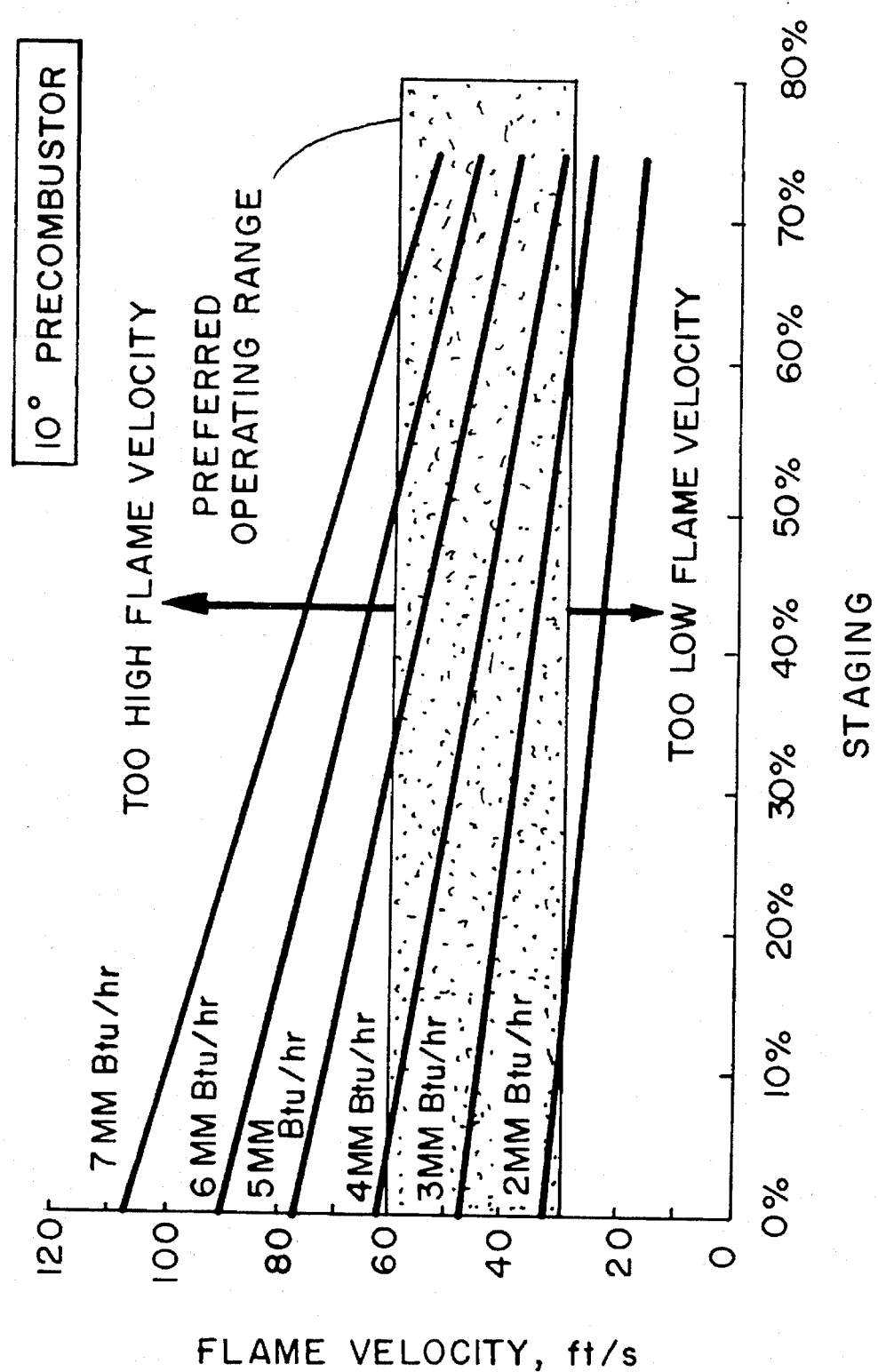
FIG. 8 is plot of flame velocity against staging for an alternate embodiment of the present invention.
Figure 9:
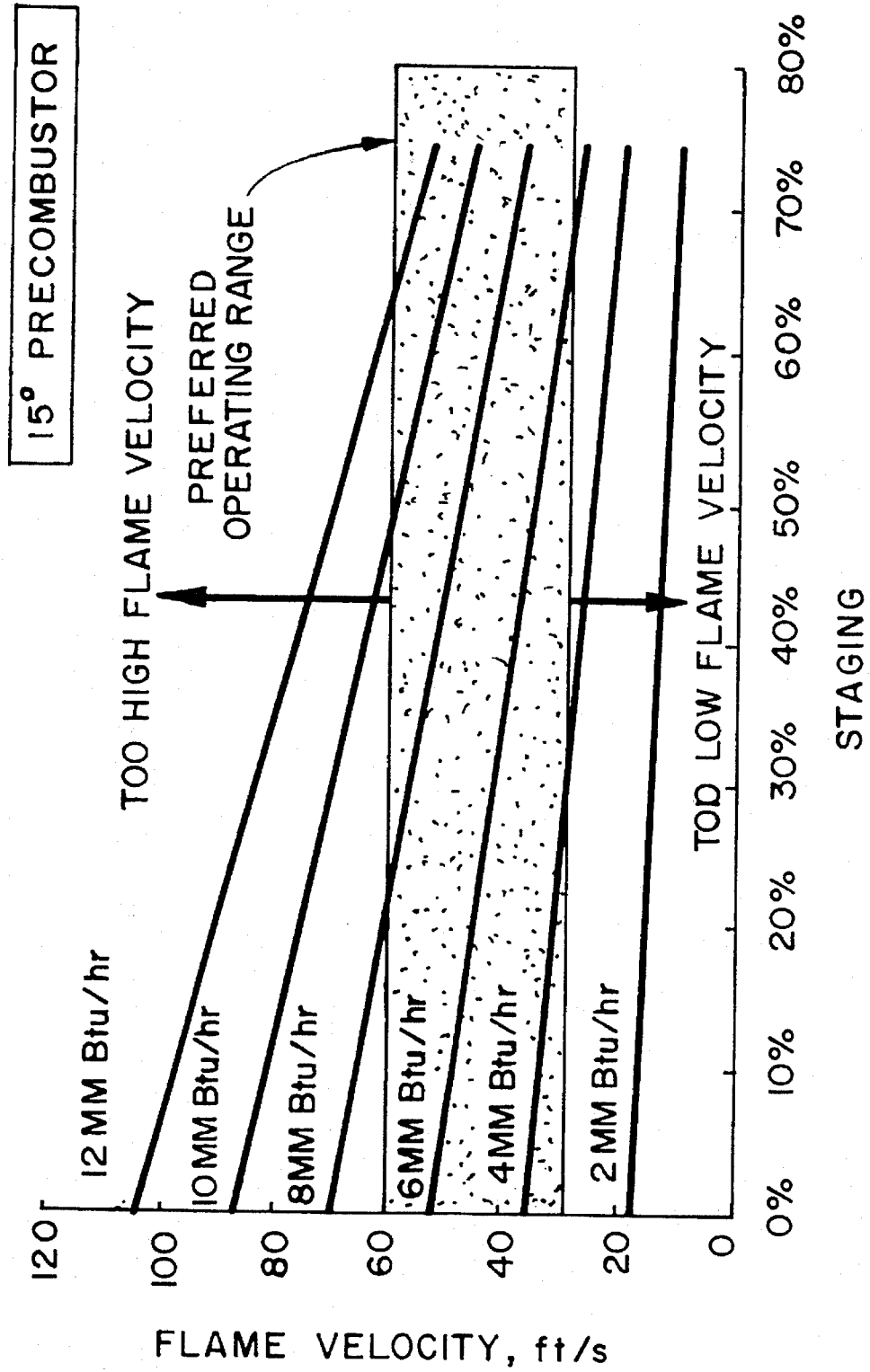
FIG. 9 is a plot of flame velocity against staging for another embodiment of the present invention.

A straight through or 0° precombustor divergence angle is the best choice for burners firing at low rates, e.g. 1 to 3 Btu/hr. Referring to FIG. 7, oxygen staging permits control of flame velocity to maintain flame length luminosity and low turbulence or mixing for low $NO_x$ operation. For higher firing rates up to 6 million Btu/hr, a 10° precombustor divergence angle is recommended. The 10° divergence angle allows for gas expansion and reduces flame acceleration inside the precombustor. FIG. 8 illustrates the preferred operating ranges where the precombustor has a 10° diverging angle. A 15° precombustor diverging angle will produce optimum flame velocity for firing rates up to 12 million Btu/hr. FIG. 9 shows the preferred operating range for the system of the present invention where the precombustor has a 15° diverging angle. However, the flame velocity at firing rates equal to or less than 3 million Btu/hr. may be too low causing improper flame shape (lofting). This effect will vary depending upon furnace temperature, i.e. the temperature difference between the flame and furnace gases. The higher this difference is, the more flame lofting will occur. Flame lofting is the phenomena that occurs when due to improper operation of the burner, the flame instead of extending generally parallel to the load rises toward the ceiling or crown of the furnace.

Set forth in Table 1 below are design parameters for a staged combustion systems according to the present invention.

TABLE I

| Parameter | Minimum | Preferred Range | Maximum |
|---|---|---|---|
| Firing Rate, MM Btu/hr | 0.5 | 1–12 | 20 |
| Fuel Nozzle Width, in | 4 | 8–24 | 40 |
| Fuel Nozzle Width/Height (w/h) | 2 | 5–30 | 60 |
| Velocity Fuel, ft/s | 10 | 30–200 | 400 |
| Velocity Combustion $O_2$, ft/s | 10 | 30–200 | 400 |
| Velocity Combustion $O_2$/Velocity Fuel | 0.25 | 0.25–1.2 | 2 |
| Velocity Staging $O_2$, ft/s | 0 | 0–60 | 100 |
| Staging $O_2$/Total $O_2$ | 0 | 0–0.75 | 0.8 |
| Overall Stoichiometry with Natural Gas | 1.0 | 1.0–2.0 | 3.0 |
| Overall Equivalence Ratio* | 2.0 | 1.0–2.0 | 0.7 |
| Precombustor Length, in | 0 | 4–18 | 24 |
| Precombustor and Staging Passage Horizontal Divergence Angle α/2, deg | −15° | 0°–+15° | +30° |
| Precombustor and Staging Passage Vertical Divergence Angle β/2, deg | −15° | 0°–+10° | +20° |

*Overall Equivalence Ratio = $\dfrac{[\text{fuel/total oxygen}]_{\text{actual}}}{[\text{fuel/total oxygen}]_{\text{theoretical}}}$ Observing the design parameters set forth in Table I will lead to effective low $NO_x$ combustion systems with luminous flames. FIGS. 7, 8 and 9 represent performance of preferred embodiments of the present invention. The flame velocities would change if the design parameters are changed such as fuel nozzle width, w/h ratio, and precombustor length.

High-temperature tests of the staged-combustion oxygen-natural gas burner produced according to the present invention were conducted in a combustion laboratory furnace. The tests were to determine the effects of oxygen staging on $NO_x$ emissions, flame length and luminosity. Temperature of the furnace was maintained at about 2300° F. while measurements were made at different staging levels.

Most of the $NO_x$ measurements were made for a fixed firing rate, overall stoichiometry, and air entrainment in the following order:

1. Base case, no staging—all oxygen through the precombustor.
2. 75% oxygen staging—25% oxygen to the precombustor.
3. 40% oxygen staging—60% oxygen to the precombustor.
4. Base case, no staging—all oxygen through the precombustor.

Figure 10:
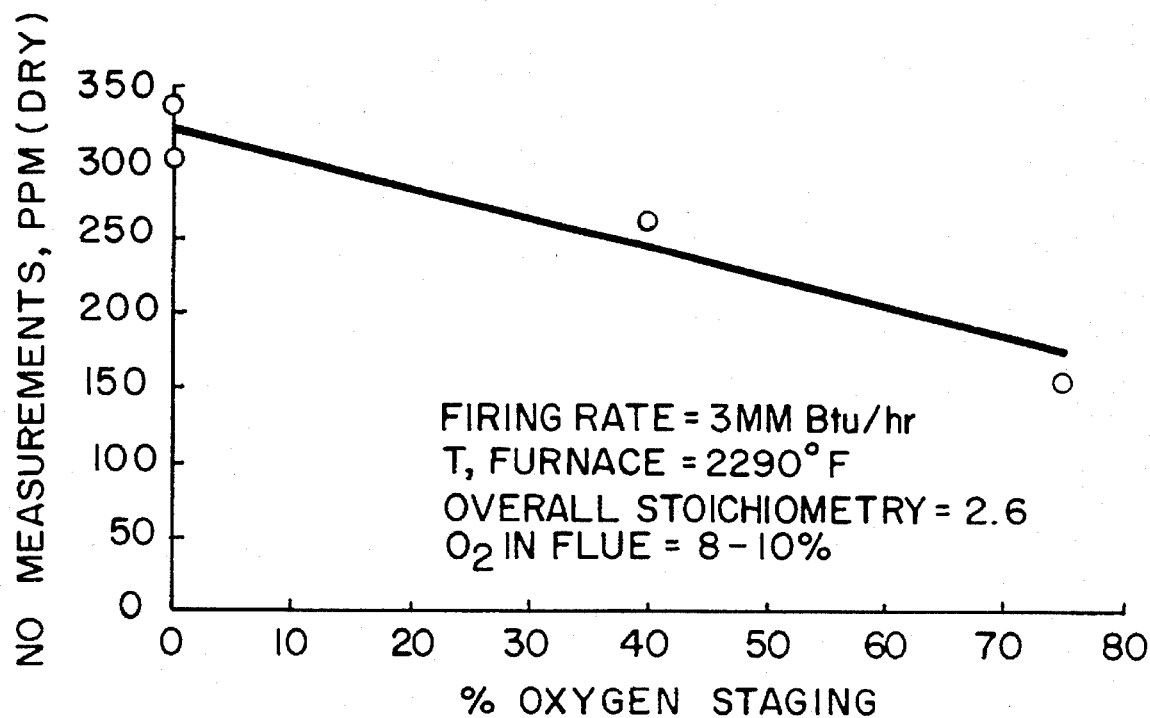
FIG. 10 is a plot of the measured NO emissions against percent oxygen staging for the method and apparatus of the present invention.
Figure 11:
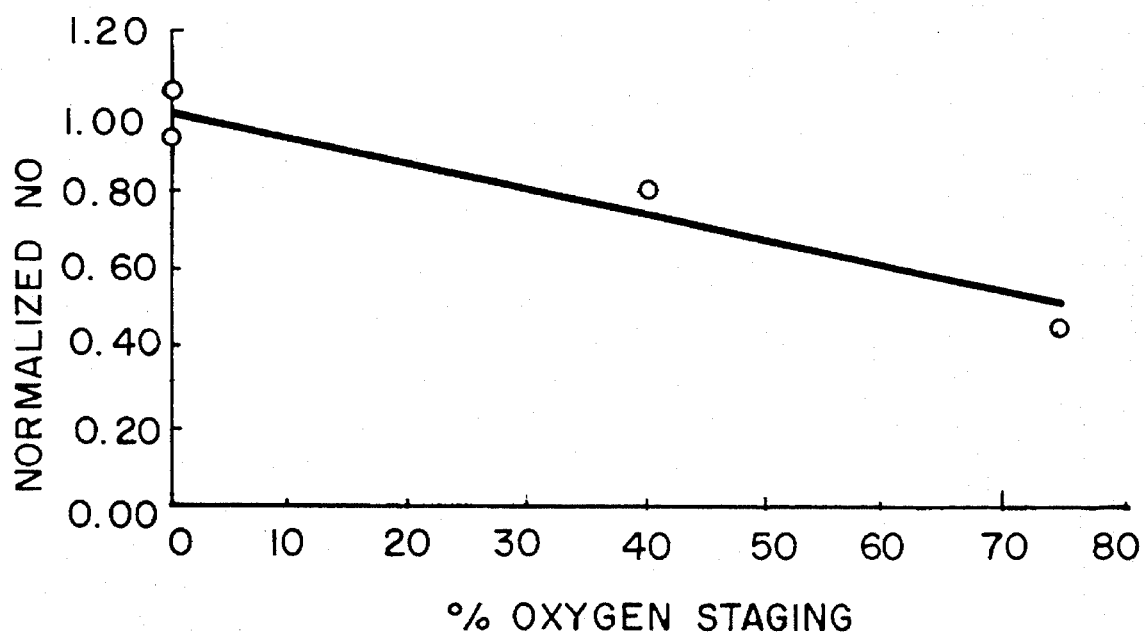
FIG. 11 is a plot of normalized NO emissions against percent oxygen staging from the data of FIG. 10.

The first and last readings were taken under identical conditions to check the reproducibility of the data. An example of a data set is shown in FIGS. 10 and 11 where NO was reduced up to 40% with oxygen staging. The same data set but with normalized NO emissions is shown in FIG. 11. The data normalization should allow comparison of NO emissions at various operating conditions.

Another more extensive set of data using different firing rates, stoichiometry and furnace temperature is shown in Table II below.

TABLE II

| Firing Rate (MM Btu/hr) | Stoichiometry | Furnace Temp. (°F.) | Staging $O_2$, (%) | Flue $O_2$, (%) | Flue CO, (ppm) | Flue NO, (ppm) | Base NO, (ppm) | Normalized NO |
|---|---|---|---|---|---|---|---|---|
| 3.0 | 2.6 | 2290 | 0 | 2 | 1300 | 650 | 650 | 1.00 |
| 3.0 | 2.6 | 2304 | 75 | 7 | 450 | 350 | 650 | 0.54 |
| 3.0 | 2.6 | 2332 | 40 | 2 | 5000 | 600 | 650 | 0.92 |
| 3.0 | 2.6 | 2345 | 0 | 4 | 950 | 650 | 650 | 1.00 |
| 2.0 | 2.6 | 1978 | 0 | 5 | 725 | 590 | 605 | 0.98 |
| 2.0 | 2.6 | 1875 | 0 | 7 | 110 | 625 | 605 | 1.03 |
| 2.0 | 2.6 | 1863 | 75 | 5 | 100 | 620 | 605 | 1.02 |
| 2.0 | 2.6 | 1919 | 40 | 5 | 290 | 550 | 605 | 0.91 |
| 2.0 | 2.6 | 1888 | 0 | 5 | 250 | 600 | 605 | 0.99 |
| 1.5 | 2.3 | 1824 | 0 | 7 | 1000 | 480 | 437.5 | 1.10 |
| 1.5 | 2.3 | 1789 | 75 | 10 | 100 | 300 | 437.5 | 0.69 |
| 1.5 | 2.3 | 1766 | 40 | 9 | 100 | 395 | 437.5 | 0.90 |
| 1.5 | 2.3 | 1761 | 0 | 9 | 100 | 395 | 437.5 | 0.90 |
| 3.0 | 2.6 | 2302 | 0 | 14 | 120 | 550 | 550 | 1.00 |
| 3.0 | 2.6 | 2310 | 75 | 8 | 150 | 400 | 550 | 0.73 |
| 3.0 | 2.6 | 2342 | 40 | 13 | 120 | 500 | 550 | 0.91 |
| 3.0 | 2.6 | 2346 | 0 | 13 | 120 | 550 | 550 | 1.00 |
| 2.0 | 2.6 | 1976 | 0 | 1 | 725 | 550 | 550 | 1.00 |
| 2.0 | 2.6 | 1866 | 75 | 6 | 110 | 400 | 550 | 0.73 |
| 2.0 | 2.6 | 1944 | 40 | 2 | 290 | 500 | 550 | 0.91 |
| 2.0 | 2.6 | 1889 | 0 | 3 | 250 | 550 | 550 | 1.00 |
| 4.0 | 2.3 | 2339 | 0 | 1 | 3200 | 250 | 225 | 1.11 |
| 4.0 | 2.3 | 2345 | 75 | 0 | 5000 | 150 | 225 | 0.67 |
| 4.0 | 2.3 | 2366 | 40 | 3 | 600 | 200 | 225 | 0.89 |
| 4.0 | 2.3 | 2375 | 0 | 2 | 2000 | 200 | 225 | 0.89 |
| 1.5 | 2.3 | 1970 | 0 | 4 | 110 | 475 | 437.5 | 1.09 |
| 1.5 | 2.3 | 1786 | 75 | 10 | 100 | 275 | 437.5 | 0.63 |
| 1.5 | 2.3 | 1770 | 40 | 9 | 100 | 395 | 437.5 | 0.90 |
| 1.5 | 2.3 | 1761 | 0 | 10 | 100 | 400 | 437.5 | 0.91 |
| 3.0 | 2.6 | 2290 | 0 | 6 | 10 | 338 | 320 | 1.06 |
| 3.0 | 2.6 | 2290 | 75 | 8 | 105 | 148 | 320 | 0.46 |
| 3.0 | 2.6 | 2290 | 40 | 4 | 46 | 258 | 320 | 0.81 |
| 3.0 | 2.6 | 2290 | 0 | 6 | 65 | 302 | 320 | 0.94 |
| 3.0 | 2.7 | 2258 | 0 | 9 | 115 | 625 | 600 | 1.04 |
| 3.0 | 2.7 | 2283 | 75 | 7 | 80 | 350 | 600 | 0.58 |
| 3.0 | 2.7 | 2306 | 0 | 8 | 80 | 575 | 600 | 0.96 |
| 3.0 | 2.7 | 2347 | 40 | 5 | 0 | 475 | 600 | 0.79 |
| 3.0 | 2.7 | 2270 | 0 | 7 | 100 | 550 | 550 | 1.00 |
| 3.0 | 2.7 | 2283 | 75 | 10 | 100 | 325 | 550 | 0.59 |
| 3.0 | 2.7 | 2309 | 0 | 15 | 80 | 550 | 550 | 1.00 |
| 3.0 | 2.7 | 2347 | 40 | 9 | 0 | 425 | 550 | 0.77 |
| 3.0 | 2.3 | 2256 | 0 | 1 | 5000 | 275 | 327.5 | 0.84 |
| 3.0 | 2.3 | 2234 | 75 | 1 | 5000 | 175 | 327.5 | 0.53 |
| 3.0 | 2.3 | 2208 | 0 | 1 | 5000 | 380 | 327.5 | 1.16 |
| 3.0 | 2.3 | 2209 | 40 | 11 | 2400 | 75 | 327.5 | 0.23 |

It should be noted that furnace nitrogen, which exact concentration was not measured, needed for $NO_x$ formation, came mostly from furnace leaks and, in small quantities, from natural gas. From Table II, it can be seen that the experiments wherein staging was employed, either at 25 or 60% oxygen through the precombustor, had a significant reduction in NO.

Table III below sets forth the results of a further series of measurements wherein a controlled amount of air, e.g. 5000 scfh at 70° F. was introduced into the furnace.

TABLE III

| Firing Rate (MM Btu/hr) | Stoichiometry | Furnace Temp. (°F.) | Staging $O_2$, (%) | Flue $O_2$, (%) | Flue CO, (ppm) | Flue NO, (ppm) | Base NO, (ppm) | Normalized NO |
|---|---|---|---|---|---|---|---|---|
| 3.0 | 2.3 | 2217 | 0 | 3.46 | 5000 | 750 | 750 | 1.00 |
| 3.0 | 2.3 | 2111 | 75 | 5.45 | 1000 | 450 | 750 | 0.60 |
| 3.0 | 2.3 | 2118 | 0 | 2.84 | 5000 | 750 | 750 | 1.00 |

TABLE III-continued

| Firing Rate (MM Btu/hr) | Stoichiometry | Furnace Temp. (°F.) | Staging $O_2$ (%) | Flue $O_2$ (%) | Flue CO (ppm) | Flue NO (ppm) | Base NO (ppm) | Normalized NO |
|---|---|---|---|---|---|---|---|---|
| 3.0 | 2.3 | 2130 | 40 | 3.9 | 3000 | 610 | 750 | 0.81 |
| 3.0 | 2.5 | 2170 | 0 | 7.45 | 400 | 1300 | 1255 | 1.04 |
| 3.0 | 2.5 | 2196 | 75 | 7.33 | 180 | 550 | 1255 | 0.44 |
| 3.0 | 2.5 | 2209 | 0 | 7.2 | 190 | 1210 | 1255 | 0.96 |
| 3.0 | 2.5 | 2215 | 40 | 9.06 | 150 | 880 | 1255 | 0.70 |

Figure 12:
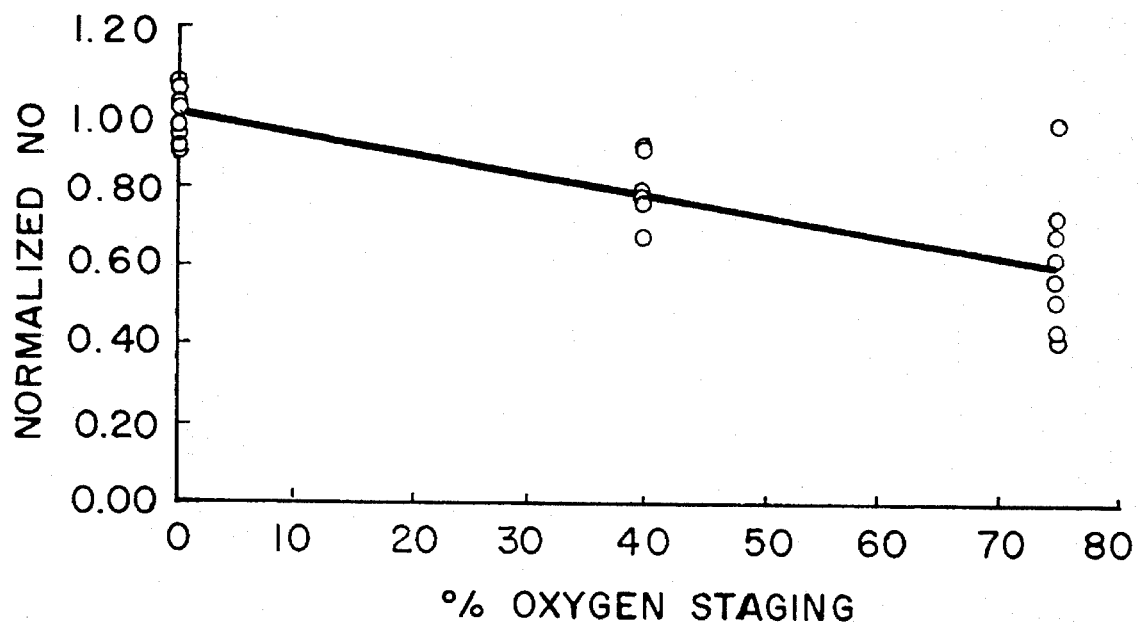
FIG. 12 is a plot of normalized NO emissions against percent oxygen staging for a variety of burner operating conditions.

From Table III, it can be seen that oxygen staging was effective to reduce the NO emissions over operation when no staging was employed. FIG. 12 graphically illustrates the efficiency of lowering NO emissions with staged combustion. As seen from FIG. 12, the NO reduction is about 40% compared to the non-staged operation for any particular set of burner operating parameters with or without additional air.

Figure 13:
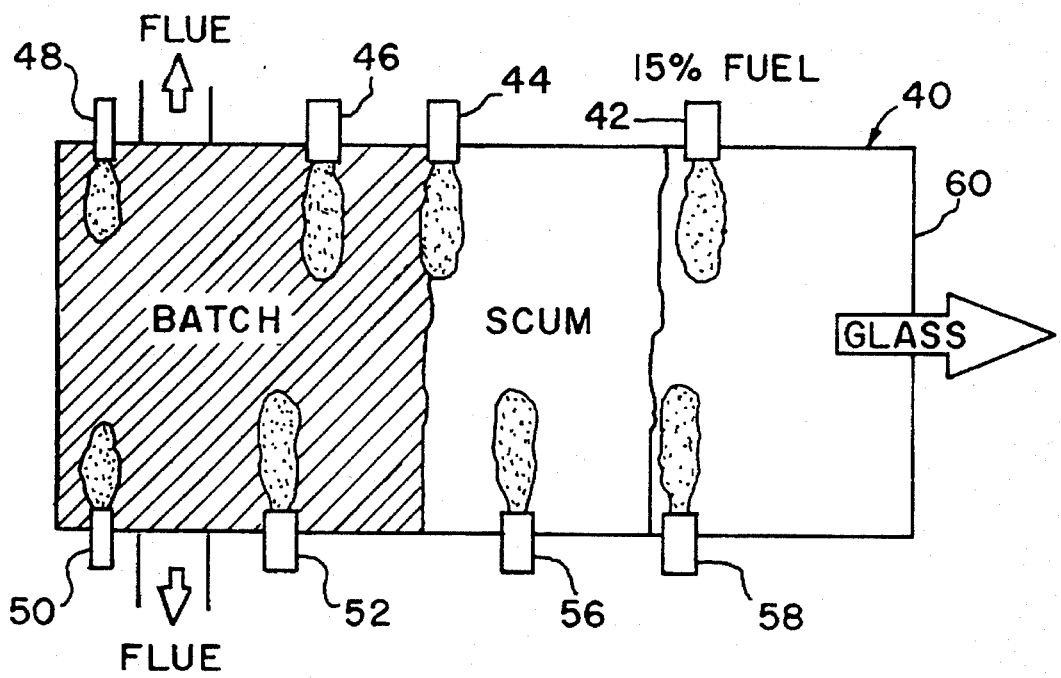
FIG. 13 is a schematic top plan view of a glass furnace heated according to the prior art.

After the laboratory tests were conducted, a staged oxygen combustion system according to the present invention was installed in a glass melting furnace operating at an average temperature of about 2800° F. at a constant pull rate of about 150 tons per day of glass. The test involved replacing one conventional oxy-fuel burner having a relatively short and narrow visible flame, low flame luminosity and relatively high flame momentum with a new stage combustion burner having a long a wide flame, high flame luminosity and much lower flame momentum. FIG. 13 shows the glass furnace 40 with the conventional burners 42, 44, 46, 48, 50, 52, 56 and 58. For the purposes of the present invention, burner 42 which utilizes 15% of the fuel utilized in the entire furnace was replaced with a combustion system according to the present invention. Burner 42 is near the pull end 60 of the furnace 40.

The objectives of the test were to:
1. observe the changes in furnace temperature by observing thermocouples in the furnace crown and in the bottom of the glass melt;
2. determine the increase in fuel efficiency, i.e. potential fuel savings, if the temperature readings increased;
3. observe if improved flame characteristics including coverage, high luminosity, and lower momentum affect the scum blanket present on the glass surface.

The scum blanket is shown as 62 in FIG. 13 and extends almost to the position of the opposed firing burners 42, 58 in the furnace 40. The portion of FIG. 13 indicated as batch indicates the position of batch materials that are unreacted which batch line extends to the position of burner 44. The use of oxy-fuel burners in a glass furnace can cause localized heating immediately under the flames which results in surface reboiling of the glass leading to scum formation. The scum on the glass surface is usually associated with poor overall heat transfer and inefficient melting operations. For some high quality glasses such as television panels and float glass, the glass quality is reduced significantly by the presence of scum on the surface of the melt. Localized glass surface overheating also affects volatilization of the batch chemicals and emissions of particulates. It has been shown that an increase in glass surface temperature of 150° C. can more than double sodium sulfate dust emissions and also increase corrosion rate of furnace refractories when the furnace has been converted to oxy-fuel firing.

Figure 14:
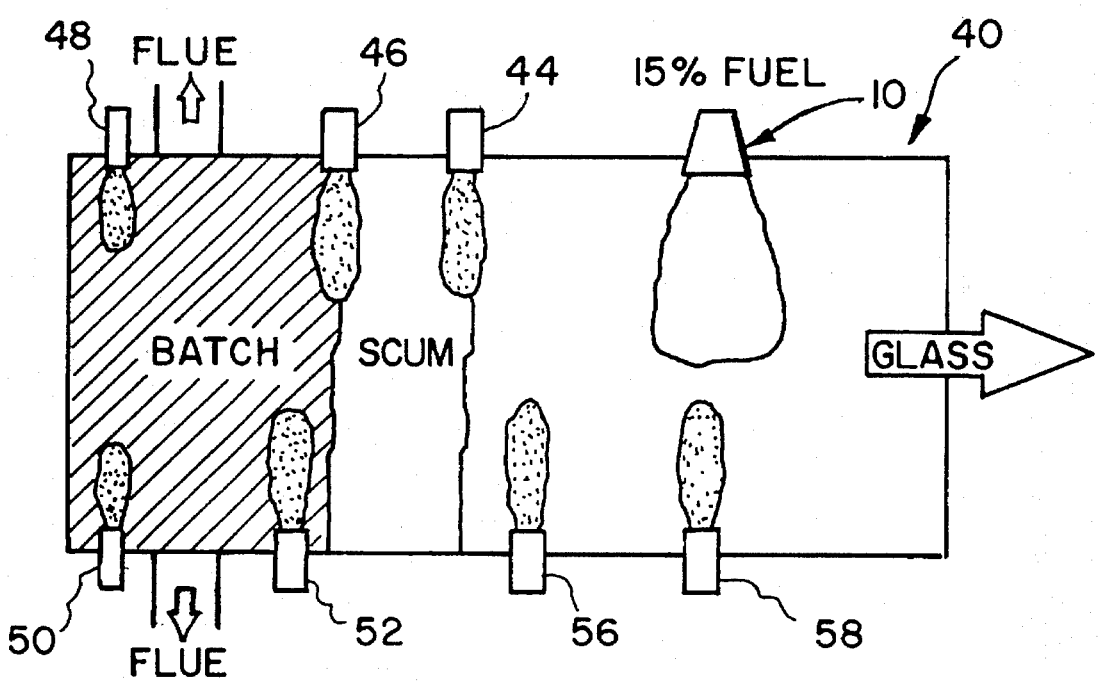
FIG. 14 is a schematic plan view of a glass melting furnace employing a burner according to the present invention.
Figure 15A:
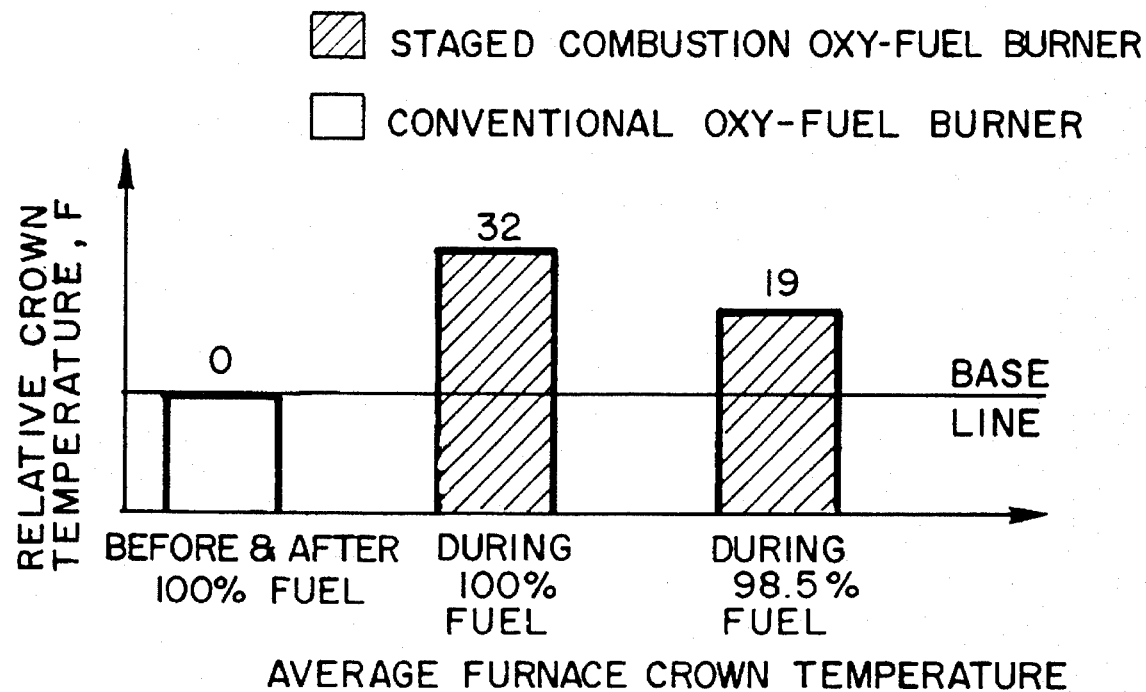
FIG. 15a is a bar graph depicting relative crown temperatures for conventional oxy-fuel burners and staged combustion according to the present invention.
Figure 15B:
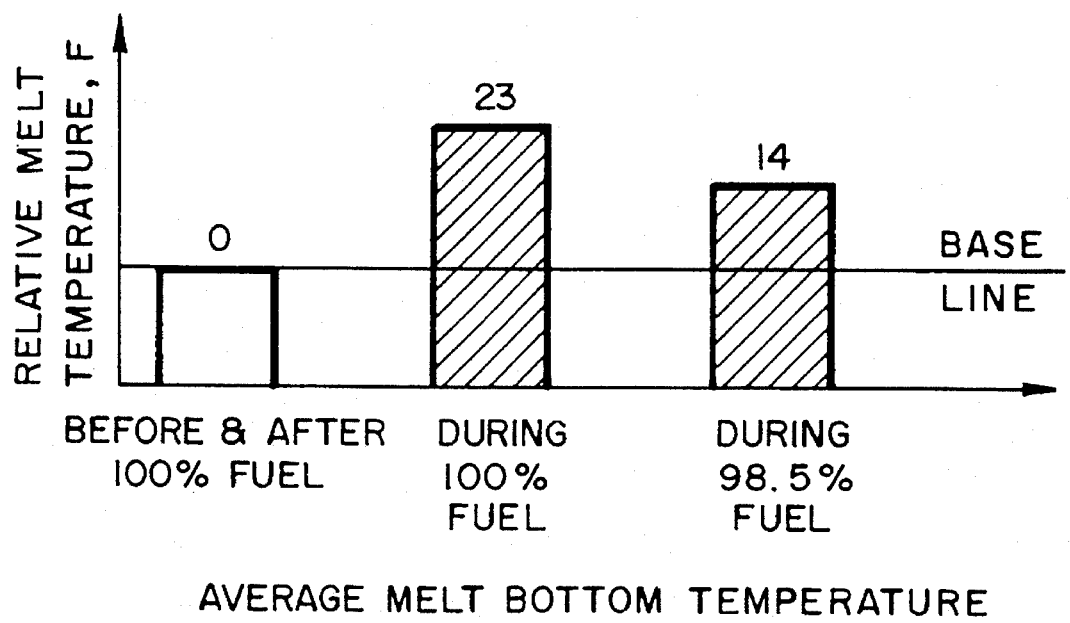
FIG. 15b is a bar graph of relative melt temperatures for conventional oxy-fuel burner and staged oxy-fuel burners according to the present invention.

According to the present invention, as shown in FIG. 14, a burner system 10 was installed in place of the burner 42 in furnace 40. As shown in FIG. 15a the average furnace crown temperature was higher when using staged combustion oxy-fuel firing according to the present invention. As shown in FIG. 16b the average melt bottom temperature was much higher during staged combustion according to the present invention as opposed to conventional oxy-fuel heating of the furnace. The temperature increased significantly when a staged combustion burner was installed. It was also observed that the total furnace fuel consumption, i.e. firing rate trend, was reduced 24 hrs. after the burner according to the present invention was installed. The reasons for fuel flow reduction was the furnace operators concern that the overall furnace temperatures were getting too high. Even with the lower firing rate, the temperature in the zone of the furnace under the burner 10 was still higher than the base line operation. The flame radiation effect was confirmed when the burner was pulled out of the furnace and the conventional burner reinstalled, thus producing a sharp temperature drop. Fuel consumption was then increased to prevent the furnace from cooling down.

As can be seen from FIG. 14, utilizing the burner according to the present invention not only increased temperature, but moved the scum line back toward the batch end of the furnace to a location approximately at burner 44 and pushed the batch line back to approximately the location of burner 46. Both conditions which would be conducive to producing high quality glass such as necessary for television panels, and float glass. In actual measurement, the scum and batch lines were moved back approximately 8 to 10 feet in the furnace.

Recently a plant producing high quality glass converted to use of the burner systems and method according to the present invention. The user was able to achieve much higher furnace charging rates and higher furnace packing rates than with prior art oxy-fuel burners heating the furnace. This use has confirmed that higher flame radiation results in more efficient heat transfer to the glass melt and may lead to fuel and oxygen savings over conventional oxy-fuel melting systems. The industrial user has confirmed higher radiation has proven to effectively reduce scum which has a direct bearing on improving the quality of glass produced.

Having thus described our invention what is desired to be secured by Letters Patent of the United States is set forth in the appended claims.

What is claimed:

1. A staged oxy-fuel burner for producing a generally flat luminous flame comprising in combination:

a housing having a first end and a flame end, said housing having a cross-sectional shape with a width and height of different dimension;

a fuel conduit having a first end and a nozzle end disposed in spaced relation to and generally concentrically within said housing said fuel conduit having a cross-sectional shape complementary to that of said housing thus defining a passage between said fuel conduit and said housing, said fuel nozzle having a width to height ratio of between 2 and 60, said nozzle end of said fuel conduit and said flame end of said housing adapted for positioning relative to each other along a longitudinal axis of said housing;

means to introduce fuel into said fuel conduit and an oxidizer into said passage between said fuel conduit and said housing, said fuel and oxygen exiting said nozzle end of said fuel conduit to produce a flame; and staging means to divert a portion of the total volume of oxidizer for efficient combustion from said passage between said fuel conduit and said housing, said staging means including a nozzle to introduce said diverted portion of said oxidizer beneath and coextensive with said flame, whereby when said burner is operated with a portion of said oxidizer introduced beneath said flame a fuel rich flame overlying a highly radiative fuel lean flame is produced.

2. An oxy-fuel burner according to claim 1 wherein said width to height ratio of said fuel nozzle and said staging nozzle are between 5 and 30.

3. An oxy-fuel burner according to claim 1 adapted to operate at a firing rate of between 0.5 and 40 million Btu/hr.

4. An oxy-fuel burner according to claim 1 adapted to operate at a firing rate of between 1 and 20 million Btu/hr.

5. An oxy-fuel burner according to claim 1 wherein the width of the fuel nozzle and the staging nozzle are between 4 and 40 inches.

6. An oxy-fuel burner according to claim 1 wherein the width of the fuel nozzle and the staging nozzle are between 8 and 24 inches.

7. An oxy-fuel burner according to claim 1 wherein said housing, said fuel conduit and said staging means includes an oxidizer conduit all having generally rectangular cross-sections.

8. A burner according to claim 1 wherein said housing, said fuel conduit and said staging means includes an oxidizer conduit all having generally arctuate elongated cross-sections.

9. A staged oxy-fuel combustor system comprising in combination:

an oxy-fuel burner having a housing having a first end and a flame end, said housing having a cross-sectional shape with a width and height of different dimensions, a fuel conduit having a first end and a nozzle end disposed in spaced relation to and concentrically within said housing, said fuel conduit having a cross-sectional shape complementary to that of said housing thus defining a passage between said fuel conduit and said housing, said fuel nozzle having a width to height ratio of between 2 and 60;

a precombustor mounted on said burner, said precombustor having a first central passage complementary to and of a width and height equal to or larger than the width and height of said burner housing said precombustor having a first end in fluid tight relation to the flame end of said housing and a second end adapted to direct said flame produced by said burner for heating in industrial environments, the longitudinal axis of said precombustor being an extension of the longitudinal axis of said housing and said burner, a second separate passage disposed beneath and coextensive with said first central passage said second passage having a nozzle end terminating in said second end of said precombustor passage and nozzle adapted to direct a fluid underneath and generally parallel to said flame, said precombustor having a length of from 1 to 24 inches; and means to introduce fuel into said fuel conduit of said burner and an oxidizer into said passage defined by said housing and said nozzle conduit, and staging means to introduce an oxidizer into said second separate passage in said precombustor whereby a fuel rich oxy-fuel flame overlays a highly radiative fuel lean flame beyond the flame end of said precombustor.

10. A burner system according to claim 9 wherein said precombustor is between 4 and 18 inches in length.

11. A burner system according to claim 9 wherein said fuel nozzle and said second passage nozzle have a width to height ratio of between 5 and 30.

12. A burner system according to claim 9 wherein the ratio of the hydraulic diameter of the flame end of the precombustor to the hydraulic diameter of the fuel nozzle in between 1 and 6.

13. A burner system according to claim 12 wherein the ratio is between 2 and 4.

14. A burner system according to claim 9 wherein walls defining the width of the first central passage and the second separate passage of the precombustor are disposed at an angle of between −15° to +30° on either side of a central axis of said precombustor.

15. A burner system according to claim 14 wherein said angle is between 0° to +15° on either side of a central axis of said precombustor.

16. A burner system according to claim 9 wherein walls defining the height of the first central passage and the second separate passage of the precombustor are disposed at an angle of between −15° to +20° on either side of a central axis of said precombustor.

17. A method of producing a low $NO_x$ oxy-fuel flame for heating a furnace to an elevated temperature comprising the steps of: producing a fuel rich oxy-fuel flame by using a post mix concentric passage oxy-fuel burner to produce said flame by causing fuel to exit a central passage and oxygen to exit a complementary passage surrounding said central passage said passages each having a width to height ratio of between 2 and 60 said fuel and oxygen exiting said burner at a minimum velocity of 15 ft/sec. introducing a highly radiative fuel lean flame underneath and coextensive to said fuel rich flame; and introducing the generally flat, fuel rich flame overlying the fuel lean flame into said furnace.

18. A method according to claim 17 wherein said velocity for said fuel lean and fuel rich flames exiting said burner are greater than 30 ft/sec.

19. A method according to claim 17 wherein said fuel rich flame is directed into a precombustor disposed on said burner said precombustor having a central passage with a shape complementary to and of a size equal to or greater than that of said passage surrounding said fuel passage, wherein said flame extends throughout the length of said precombustor without significant combustion occurring on the wall forming the precombustor and said fuel lean flame is created and directed by directing oxidizer underneath said fuel rich flame from a location at an exit end of said precombustor.

20. A method according to claim 19 wherein said precombustor directs said flame for a distance not to exceed 24 inches.

* * * * *